US007038724B2

(12) United States Patent
Satoh et al.

(10) Patent No.: US 7,038,724 B2
(45) Date of Patent: May 2, 2006

(54) IMAGE PICKUP APPARATUS, METHOD, AND STORAGE MEDIUM FOR DISPLAYING, COMPRESSING, AND ENCODING IMAGE DATA

(75) Inventors: Makoto Satoh, Tokyo (JP); Satoshi Ishiguro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/110,018

(22) Filed: Jul. 2, 1998

(65) Prior Publication Data
US 2003/0193602 A1 Oct. 16, 2003

(30) Foreign Application Priority Data
Jul. 4, 1997 (JP) .................................. 9-179566

(51) Int. Cl.
H04N 5/222 (2006.01)
(52) U.S. Cl. .............................. 348/333.05; 348/231.3; 348/333.02
(58) Field of Classification Search ........... 348/231.99, 348/231.3, 231.7, 222.1, 333.01, 333.02, 348/333.05, 333.11, 333.12
See application file for complete search history.

(56) References Cited

U.S. PATENT DOCUMENTS

| 4,750,048 | A | | 6/1988 | Satoh et al. ................. 358/287 |
| 4,827,347 | A | * | 5/1989 | Bell ........................ 348/333.05 |
| 5,164,831 | A | * | 11/1992 | Kuchta et al. ............ 348/231.7 |
| 5,742,339 | A | * | 4/1998 | Wakui ....................... 348/231.9 |
| 5,764,800 | A | * | 6/1998 | Yamagata ................... 382/232 |
| 5,821,997 | A | | 10/1998 | Kawamura et al. |
| 5,956,084 | A | * | 9/1999 | Moronaga et al. ...... 348/333.01 |
| 5,978,016 | A | * | 11/1999 | Lourette et al. .......... 348/231.6 |
| 6,137,534 | A | * | 10/2000 | Anderson ............... 348/333.01 |
| 6,215,523 | B1 | * | 4/2001 | Anderson ............... 348/333.05 |
| 6,233,015 | B1 | * | 5/2001 | Miller et al. ............ 348/333.11 |
| 6,249,316 | B1 | * | 6/2001 | Anderson ............... 348/333.05 |
| 6,515,697 | B1 | * | 2/2003 | Yamada et al. .......... 348/231.7 |
| 6,522,354 | B1 | * | 2/2003 | Kawamura et al. ..... 348/333.05 |
| 6,542,192 | B1 | * | 4/2003 | Akiyama et al. ....... 348/333.11 |
| 6,563,535 | B1 | * | 5/2003 | Anderson ................. 348/231.2 |
| 2001/0013894 | A1 | * | 8/2001 | Parulski et al. ............. 348/223 |
| 2005/0231612 | A1 | * | 10/2005 | Suzuki et al. ........... 348/231.99 |

FOREIGN PATENT DOCUMENTS

JP          A6471377          3/1989

(Continued)

Primary Examiner—Ngoc-Yen Vu
Assistant Examiner—Jason Whipkey
(74) Attorney, Agent, or Firm—Fitzpatrick, Cella, Harper & Scinto

(57) ABSTRACT

In order to obtain a digital still camera capable of storing only a desired image from photography images, a photography image data generation unit processes an image signal from a CCD to generate high-, middle-, and low-resolution image data. While a photography timing designation button is not depressed, the middle-resolution data is monitored in D1 of a display through a buffer memory. When the photography timing designation button is depressed, high- and low-resolution data of three consecutive frames are generated and stored in M2 to M7 of the buffer memory, and low-resolution data are displayed in D2 to D4 of the display. The high-resolution data are compressed and encoded, and then stored in C1 to C3 of a main memory. When the user selects, e.g., D3 of the displayed D2 to D4 with a touch panel, the corresponding data of C2 is extracted from C1 to C3 and stored in F1 of a nonvolatile memory.

9 Claims, 12 Drawing Sheets

FOREIGN PATENT DOCUMENTS

| | | |
|---|---|---|
| JP | A-03-36886 | 2/1991 |
| JP | A-04-886 | 1/1992 |
| JP | A-05-145884 | 6/1993 |
| JP | A-05-344460 | 12/1993 |
| JP | A-06-98288 | 4/1994 |
| JP | A-08-205014 | 8/1996 |

* cited by examiner

IMAGE PICKUP APPARATUS, METHOD, AND STORAGE MEDIUM FOR DISPLAYING, COMPRESSING, AND ENCODING IMAGE DATA

BACKGROUND OF THE INVENTION

1. Field of the Invention

The present invention relates to an image pickup apparatus and, more particularly, to an image pickup apparatus such as a digital still camera having a display which is used for displaying a stored photography image or serves as a viewfinder, a digital still camera having a data communication function, or a digital still camera having a function of deleting the stored photography image.

2. Related Background Art

In a conventional digital still camera for electrically photographing a still image, an output signal from an image pickup element is compressed and encoded every time a release button is depressed. The resultant image files are sequentially stored in a nonvolatile memory 24.

When continuous photography is performed with the conventional digital still camera, the image files of all the photography images are stored in the nonvolatile memory. When the user then checks the photographed images on a display such as an LCD and finds failed or undesired unnecessary images, he must delete these image files from the nonvolatile memory using an image deletion function, thus requiring the user a cumbersome operation. Excessive write and delete operations are performed for the nonvolatile memory whose total write count is limited.

A display provided in a conventional digital still camera is often compact and has a low resolution when deleting an image is performed. The image displayed on the display has a large difference from the corresponding image represented by the actual data. Therefore, even if an image is properly displayed on the color liquid crystal monitor, unsuccessful photography such as exposure errors and vibration cannot be often noticed until the data is transferred to a device such as a personal computer.

The above-mentioned method of deleting the image cannot be practiced in an optical finder-type digital still camera having no color liquid crystal monitor. The images must be deleted while checking the images after the corresponding data are transferred to the personal computer or the like.

SUMMARY OF THE INVENTION

It is an object of the present invention to allow, a digital still camera having an electronic viewfinder or a display such as an LCD to photograph a plurality of continuous frames, display the list of photographed images on a display immediately upon photography, enlarge and display one of the photographed images, as needed, specify photographed images as storage targets, and store only these specified images in a nonvolatile memory or the like.

It is another object of the present invention to shorten a time for actually storing photographed images upon specifying the photographed images serving as the storage targets.

It is still another object of the present invention to attain a change in compression ratio in compressing and encoding photographed images upon specifying the photographed images serving as storage targets.

It is still another object of the present invention to provide a function of extracting unsuccessful photography candidates from the images photographed in a camera, and classifying and displaying them, thereby allowing a user to perform more appropriate photography.

It is still another object of the present invention to reduce an image deletion time and efficiently use a memory by collectively deleting the images from the memory upon extracting and displaying unsuccessful photography.

It is still another object of the present invention to extract, display, and delete unsuccessful photography even in a digital still camera having no liquid crystal monitor.

In order to achieve at least one of the above objects, according to an aspect of the present invention, there is provided an image pickup apparatus comprising:

image pickup means for picking up an image of an object to output an image signal;

image processing means for processing the image signal to generate high-resolution image data and low-resolution image data;

designation means for outputting designation so as to cause the image processing means to process the image signals of a plurality of frames;

first storage means for storing the high- and low-resolution image data of the plurality of frames which are obtained by processing the image signals in accordance with the designation;

display means for displaying an image;

display control means for displaying the low-resolution image data of the plurality of frames stored in the first storage means on the display means;

compression encoding means for compressing and encoding, at a predetermined compression ratio, the high-resolution image data of the plurality of frames stored in the first storage means;

second storage means for storing the compressed and encoded image data of the plurality of frames; and first selection means for selecting and outputting image data of a desired frame from the image data of the plurality of frames stored in the second storage means, on the basis of display of the display means.

According to another aspect of the present invention, there is provided an image pickup apparatus comprising:

image pickup means for picking up an image of an object to output; an image signal;

storage means for storing the image signal;

image evaluation means for analyzing and evaluating the image signal stored in the storage means and classifying an evaluation result into types in accordance with a predetermined discrimination reference; and display means for displaying the classified types.

The above and other objects, features, and advantages of the present invention will be apparent from the detailed description of the preferred embodiments taken in conjunction with the accompanying drawings.

DESCRIPTION OF THE PREFERRED EMBODIMENTS

The first embodiment of the present invention will be described below.

Figure 1:
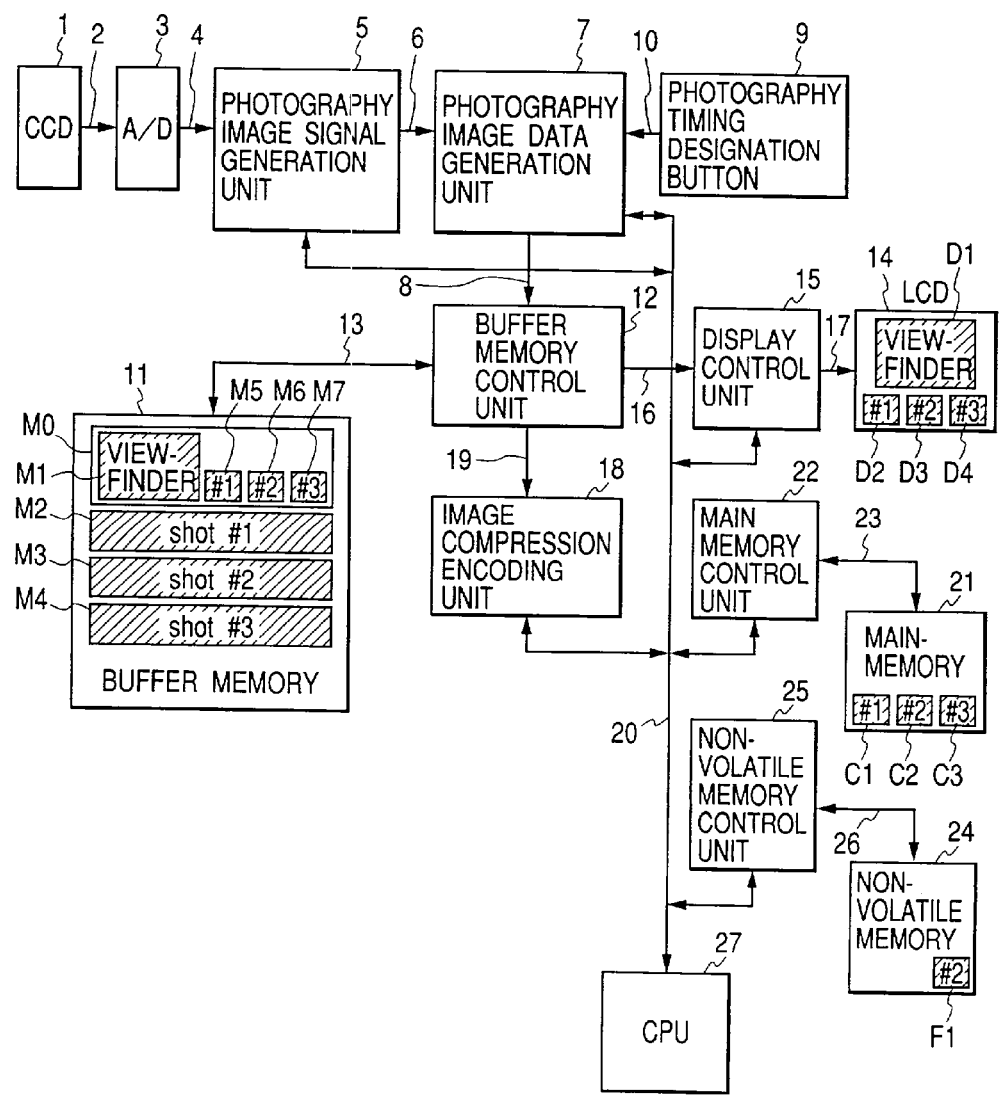
FIG. 1 is a block diagram of a digital still camera according to the first embodiment of the present invention.

FIG. 1 is a block diagram of a digital still camera according to the first embodiment.

Referring to FIG. 1, a CCD analog signal 2 generated by a (CD 1 is input to an A/D converter 3. A CCD digital signal 4 A/D-converted by the A/D converter 3 is input to a photography image signal generation unit 5. The photography image signal generation unit 5 performs gain control, gamma correction, white balance correction, CCD filter matrix correction, and color space conversion using the input CCD digital signal 4, generates photography image signals synchronized in units of frames, and sequentially outputs them as photography image signals 6. The correction parameters and photography parameters (e.g., exposure time) are set by a program in a CPU 27. The photography image signal generation unit 5 is constituted by a DSP or the like.

The photography image signal 6 is sent to a photography image data generation unit 7 and converted into a pixel density, i.e., a spatial resolution (the number of pixels). The photography image data generation unit 7 outputs frame-synchronized photography image data 8 in accordance with a photography timing designation signal 10 output from a photography timing designation button 9. The photography image data generated by the photography image data generation unit 7 represents a resolution of one of three different image data, i.e., high-resolution image data for storage, middle-resolution image data for a viewfinder, and low-resolution image data for storage selection. The photography image data 8 having any one of the resolutions is stored in a predetermined portion of a buffer memory 11 through a buffer memory control unit 12.

While the photography timing designation button 9 is not depressed, the photography image data generation unit 7 generates the middle-resolution image data for a viewfinder as the photography image data 8 in units of frames so as to operate an electronic viewfinder on a display 14 and finally stores the generated data in a portion M1 in the buffer memory 11 through the buffer memory control unit 12.

Upon depressing the photography timing designation button 9, the photography image data generation unit 7 generates photography image signals of three consecutive frames, generates two different photography image data 8, i.e., the high-resolution image data for storage and the low-resolution image data for storage selection in correspondence with the generated photography image signals, and finally stores all the photography image data 8 in predetermined portions M2 to M4 and M5 to M7 in the buffer memory 11 through the buffer memory control unit 12 in a manner to be described later.

The buffer memory control unit 12 controls write and read accesses to the buffer memory 11 using a buffer memory control signal 13. The buffer memory control unit 12 receives three access requests for the buffer memory 11, i.e., a write request of the photography image data 8 from the photography image data generation unit 7, a read request of display image data 16 from a display control unit 15, and a read request of storage image data 19 from an image compression encoding unit 18. The buffer memory control unit 12 performs arbitration control and access order control of these access requests.

The storage positions of the above photography image data in the buffer memory 11 are shown in FIG. 1. The middle-resolution image data for a viewfinder is stored in the portion M1 in units of frames. Upon depressing the photography timing designation button 9, the high-resolution image data corresponding to the photography image of the first one of the three consecutive frames is stored in the portion M2, and the corresponding low-resolution image data is stored in the portion M5. The high-resolution image data of the photography image of the next frame is stored in the portion M3, and the corresponding low-resolution image data is stored in the portion M6. The high-resolution image data of the photography image of the last frame is stored in the portion M4, and the corresponding low-resolution image data is stored in the portion M7.

The display control unit 15 performs screen display control of the display 14 using the display control signal 17. The display image data constituting the screen displayed on the display 14 is stored in the portion M0 in the buffer memory 11. The buffer memory control unit 12 sends the display image data 16 stored in the portion M0 to the control unit 15 in accordance with a read request for the display image data 16 from the display control unit 15.

While the photography timing designation button 9 is not depressed, the photography image data generation unit 7 stores the middle-resolution image data for a viewfinder in units of frames in the portion M1 as part of the display image data area M0 so as to display the images photographed by the CCD 1 on the display 14. As a result, the middle-resolution photography image data are continuously displayed in a portion D1 on the display 14.

Upon depressing the photography timing designation button 9, the photography image data generation unit 7 stores the low-resolution image data for storage selection corresponding to the three consecutive frames in the portions M5 to M7 as part of the display image data area M0. As a result, the low-resolution photography image data are displayed on portions D2 to D4 on the display 14.

The image compression encoding unit 18 sequentially reads out, as storage image data 19, the three high-resolution image data stored in the portions M2 to M4 in the buffer memory 11. The readout data are compressed and encoded, and the resultant data are stored as image files in predetermined positions C1 to C3 in a main memory 21 through a CPU bus 20 and a main memory control unit 22. The above compression and encoding operation is started immediately after all the high-resolution image data for storage corresponding to the three consecutive frames are stored in the portions M2 to M4 in the buffer memory 11 by the photography image data generation unit 7.

The main memory control unit 22 controls read and write accesses to the main memory 21 constituted by a D-RAM or the like using a main memory control signal 23. The access requests for the main memory 21 are an image file write request from the compression encoding unit 18 in addition to the program and data access requests from the CPU 27. The main memory control unit 22 performs arbitration control of the access order of the above requests and access order control.

The user depresses the photography timing designation button 9, visually checks the low-resolution image data for storage selection displayed in the portions D2 to D4 on the display 14, and then selects photography images to be actually stored. A method of selecting images to be stored is not limited to a specific one. In this embodiment, the user depresses the portions D2 to D4 of the touch panel covering the display 14 to select the images to be stored.

When the selection operation of the user is complete, the CPU 27 transfers, to a nonvolatile memory 24, an image file corresponding to the low-resolution image data actually selected from the image files C1 to C3 temporarily stored in the main memory 21.

During the selection operation of the user, every time the user selects (depresses) low-resolution image data with a touch panel or the like, the photography image data generation unit 7 reads out the high-resolution image data corresponding to the selected low-resolution image data from the buffer memory 11 through the buffer memory control unit 12, converts the readout high-resolution image data into a pixel density, writes the pixel density in the portion M1 in the buffer memory 11, and enlarges and displays the pixel density in the portion D1 on the display 14.

A nonvolatile memory control unit 25 controls write and read accesses to the nonvolatile memory 24 constituted by a flash ROM or the like using a nonvolatile memory control signal 26. The access requests for the nonvolatile memory 24 are data read and write access requests from the CPU 27.

In FIG. 1, the image file of photography image #2 corresponding to the second frame is selected and stored in the nonvolatile memory 24. A plurality of photography images can be selected in the same manner as in selection of one photography image as described above.

After all the selected image files are transferred and stored in the nonvolatile memory 24, the CPU 27 deletes all the image files from the temporary storage areas C1 to C3 in the main memory 21 and returns to prepare for the next photography operation.

The photography images of the three consecutive frames which are photographed when the user depresses the photography timing designation button 9 may be obtained by using the same photography parameters (e.g., exposure time) or different photography parameters represented by the exposure time in units of frames. In addition, the photography images may correspond to three consecutive frames or may be separated every predetermined frames.

The number of photography images continuously and temporarily stored (i.e., the number of frames) is defined as 3. However, the number of photography images may be any number if it is 2 or more. The upper limit of the number of photography images depends on the capacity of the buffer memory 11, the capacity of the main memory 21, the size of the display 14, and the display resolution.

According to the first embodiment described above, the user can select image data, on the spot, photographed at optimal timings or using photography parameters represented by the exposure time, from a plurality of photography images automatically photographed and temporarily stored when the user depresses the photography timing designation button 9. The nonvolatile memory 24 stores only the photography image files selected in this manner, and the use efficiency of the nonvolatile memory 24 can be improved without any loss. An effect of reducing excessive write and delete operations for the nonvolatile memory element having the limited write count can also be expected.

In selection operation, the selected (the depressed corresponding portion of the touch panel) low-resolution image data is enlarged and displayed in the viewfinder portion D1 on the display 14. Therefore, this facilitate to discriminate whether the image is finally stored or not.

In this embodiment, as the user selects photography images serving as storage targets, the image file corresponding to the photography image selected from the image files C1 to C3 already compressed and encoded in the main memory 21 is directly transferred to the nonvolatile memory 24. As optional operation, the image compression encoding unit 18 can read out the high-resolution image data corresponding to the selected photography image from the buffer memory 11 again, compress and encode the readout data at a compression ratio different from that for the first time, store the compressed encoded data in the main memory 21, and finally store it in the nonvolatile memory 24.

When the user is to select photography images serving as storage targets, an image file obtained by compressing and encoding the most favorite photography image again at a low compression ratio for small distortion can be stored. An image file obtained by compressing and encoding an unsatisfactory photography image again, which is to be stored for the time being, at a high compression ratio for a small file size can be stored.

When the nonvolatile memory 24 and its control unit 25 are defined as a data communication unit, the user can select, on the spot, an optimal photography image to be transferred, immediately after photography is complete.

The second embodiment of the present invention will be described below in relation to a method of deleting an image in the digital still camera having a color liquid crystal monitor. The operation flow of this digital still camera is shown in FIGS. 11 and 12.

Figure 11:
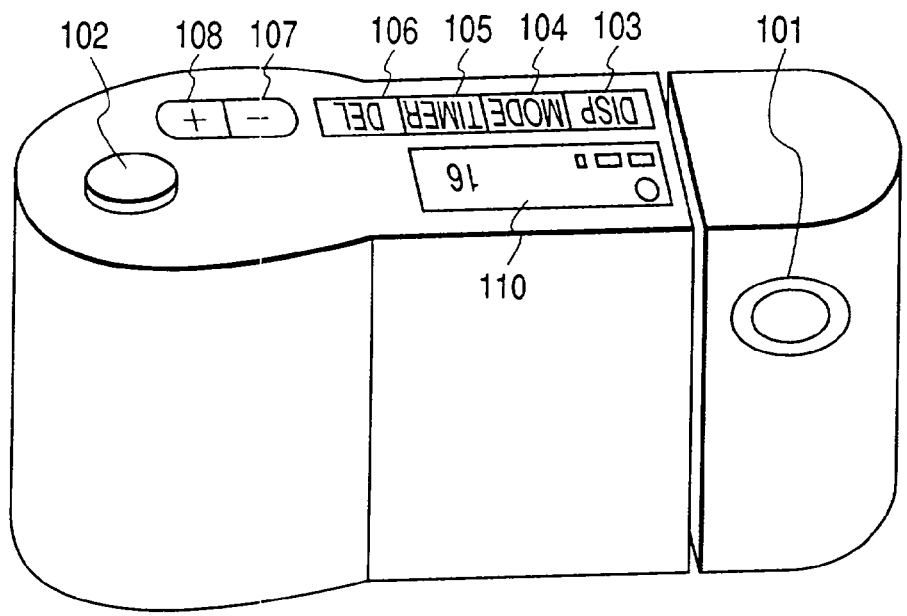
FIG. 11 is a front view showing the outer appearance of the digital still camera having a liquid crystal monitor according to the second embodiment.
Figure 12:
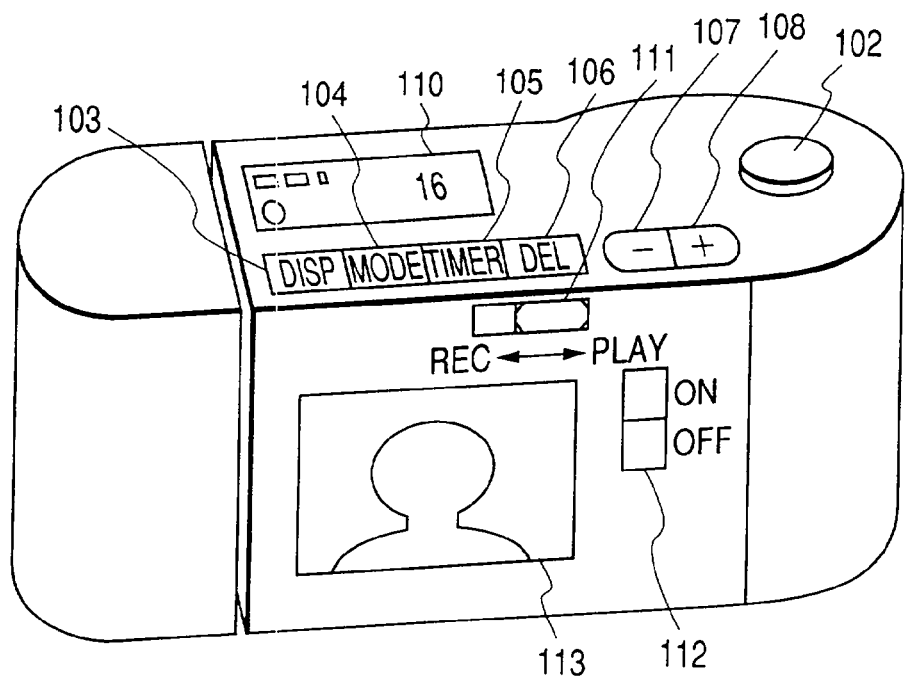
FIG. 12 is a rear view showing the outer appearance of the digital still camera having the liquid crystal monitor according to the second embodiment.

FIGS. 11 and 12 are a front view and a rear view, respectively, showing the outer appearance of the digital still camera having a color liquid crystal monitor serving as a display according to the second embodiment. The digital still camera comprises a lens 101, a release switch 102, a display change switch 103 for selecting normal display or thumbnail display, switches 104 and 105 for setting exposure and a self-timer in combination with other switches, an image deletion switch 106, image selection switches 107 and 108, a monochrome liquid crystal panel 110 for displaying the remaining battery power, the number of images which can be photographed, and the like, a photographing/reproduction mode change switch 111, a power switch 112, and a photography image/reproduction image display color liquid crystal monitor 113.

Figure 7:
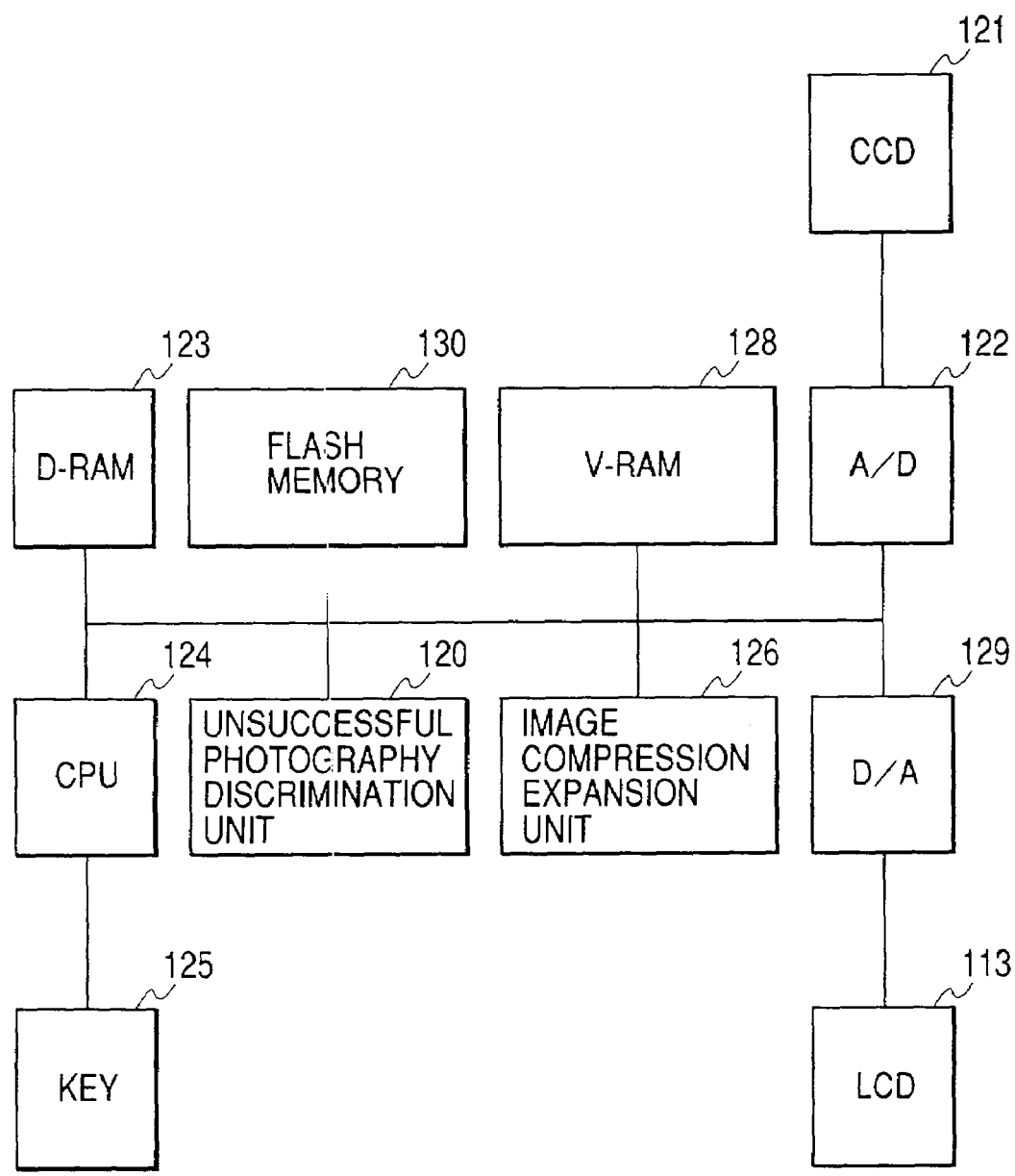
FIG. 7 is a block diagram of the digital still camera according to the second embodiment.

FIG. 7 is a block diagram showing the circuit of the digital still camera of the second embodiment. The circuit comprises a CCD 121, an A/D converter 122, a D-RAM 123 which temporarily stores a signal from the CCD 121 and is used as an image processing buffer, an image processing CPU 124 for adjusting image colors and density, operation keys 125 whose key operation is processed by the CPU 124, and an image compression expansion unit 126 for compressing or expanding the processed image. This image compression expansion unit 126 may be substituted by the CPU 124. The circuit also comprises the color liquid crystal monitor (LCD) 113 in FIG. 12, a V-RAM 128 for storing images to be displayed on the color liquid crystal monitor 113, a D/A converter 129, and a flash memory 130 for storing the image compressed by the image compression expansion unit 126.

An unsuccessful photography discrimination unit 120 reads out the compressed image data stored in the flash memory 13C and discriminates unsuccessful photography such. as underexposure, overexposure, or vibration through image processing. At the same time, the unsuccessful photography discrimination unit 120 quantitatively discriminates the degree of unsuccessful photography. If unsuccessful photography exceeding the set range occurs, the type and degree of unsuccessful photography are replaced with characters and symbols. The character and symbol data are superposed on the image data in the V-RAM 128, and the resultant data is output to the color liquid crystal monitor 113. The CPU 124 monitors the operations of the operation keys 125. If a delete operation is detected, the corresponding image in the flash memory 130 is deleted.

Note that the unsuccessful photography discrimination unit 120 is illustrated as an independent unit for descriptive convenience, but it can be arranged as software using the CPU 124, as a matter of course.

The sequence of deleting a photographed image in the digital still camera having a color liquid crystal monitor according to this embodiment will be described together with FIG. 13.

(1) Mode Change and Image Display and Selection

Process 131: Mode Change

Upon photography, the photographing/reproduction mode change switch 111 is switched to the reproduction side to set the reproduction mode.

Process 132: Image Display and Selection

When the camera is set in the reproduction mode, the image stored in the flash memory 130 is displayed on the color liquid crystal monitor 113. The display form is switched by selecting normal single display 135 or thumbnail display 136 using the display change switch 103. The display image is selected by operating the selection switches 107 and 108. In the normal display mode, the images are displayed in the forward and reverse directions in the order of photography. In the thumbnail display mode, a cursor 137 on the thumbnail is operated by the selection switches 107 and 108.

(2) Delete Mode Change

When a predetermined operation using the deletion switch 106 in a state in which an arbitrary image is displayed, the deletion mode is changed to any one of the three modes.

Operation 141: depresses the deletion switch within a short period of time normal deletion mode Operation 142: keeps depressing the release switch 102 while the deletion switch is kept depressed: unsuccessful photography discrimination mode 1

Operation 143: depresses the release switch 102 while the deletion switch is kept depressed: unsuccessful photography discrimination mode 2

The above modes will be described below.

Figure 13:
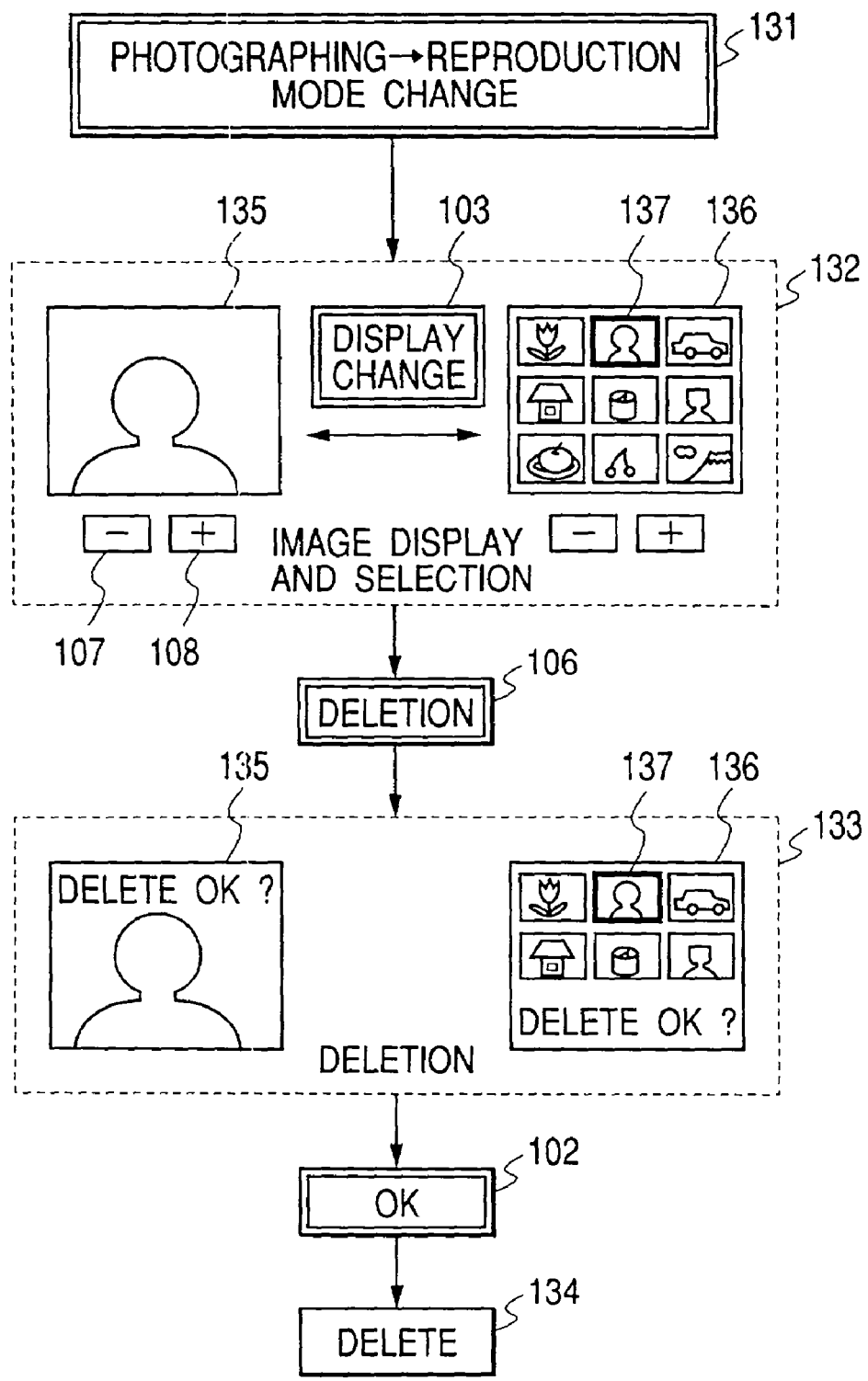
FIG. 13 is a flow chart showing an image deletion sequence of the digital still camera having the liquid crystal monitor according to the second embodiment.

The normal deletion mode set by the operation 141 is a mode of deleting the image displayed and selected as in the processes 133 and 134 shown in FIG. 13.

Process 133: Deletion Confirmation

An image to be deleted is displayed as described above and confirmed, the deletion switch 106 is operated to display a deletion confirmation message "delete OK?" on the screen.

Process 134: Deletion

When the release switch 102 is depressed while the deletion confirmation message is kept displayed, the selected image is deleted from the flash memory 130.

By the series of operations described above, an arbitrary image in the flash memory 130 can be deleted.

In addition to the above method, all the images in the flash memory 130 can be collectively deleted.

Unsuccessful photography discrimination mode 1 set by the operation 142 is to evaluate whether unsuccessful photography occurs in one displayed and selected image.

Unsuccessful photography discrimination mode 2 set by the operation 143 is to evaluate whether unsuccessful photography occurs in all the images in the flash memory.

A cause of an unsuccessful photography image determined in unsuccessful photography discrimination modes 1 and 2 is displayed on the image.

(3) Unsuccessful Photography Extraction

Figure 2:
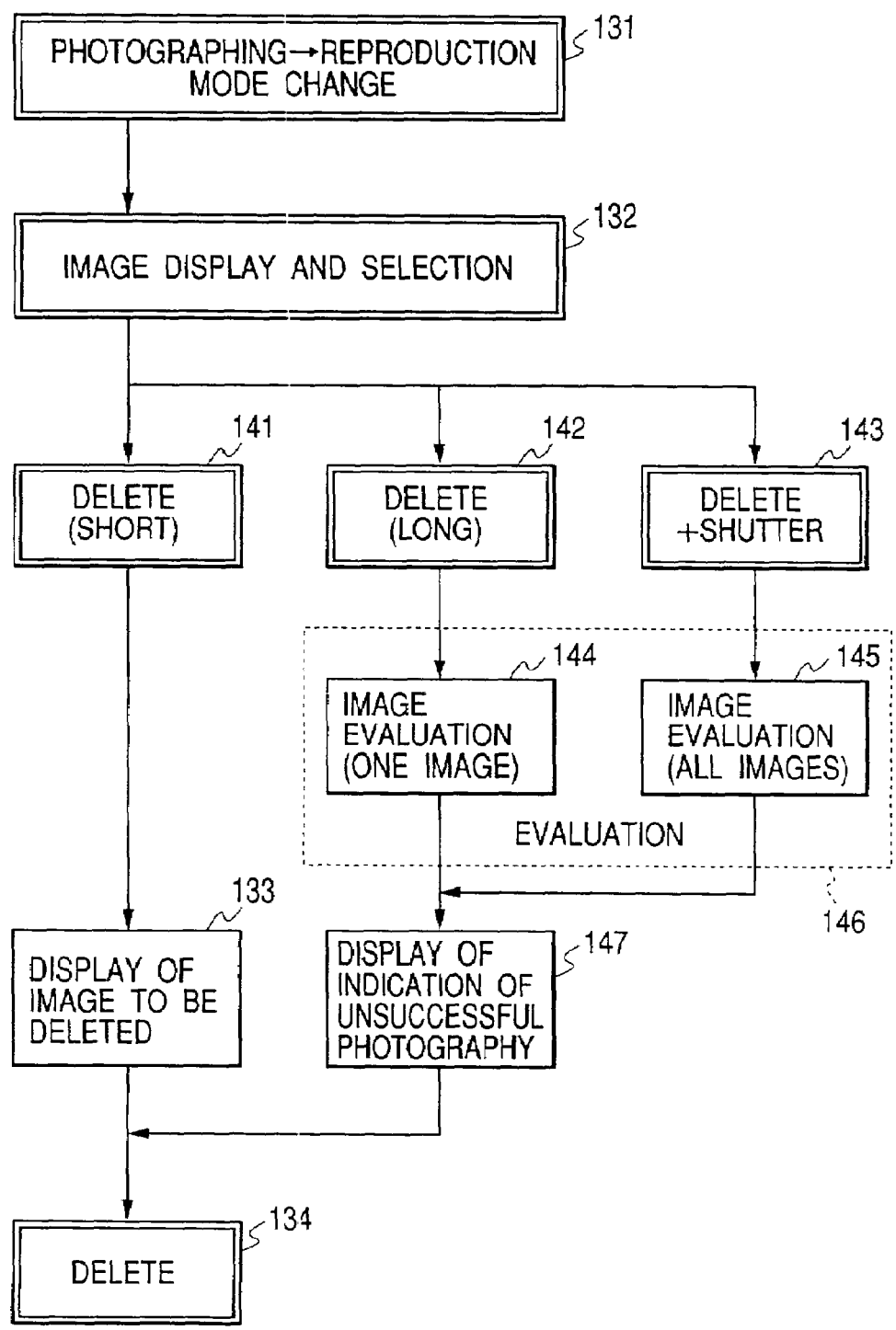
FIG. 2 is a flow chart showing an image deletion sequence of a digital still camera according to the second embodiment.
Figure 3:
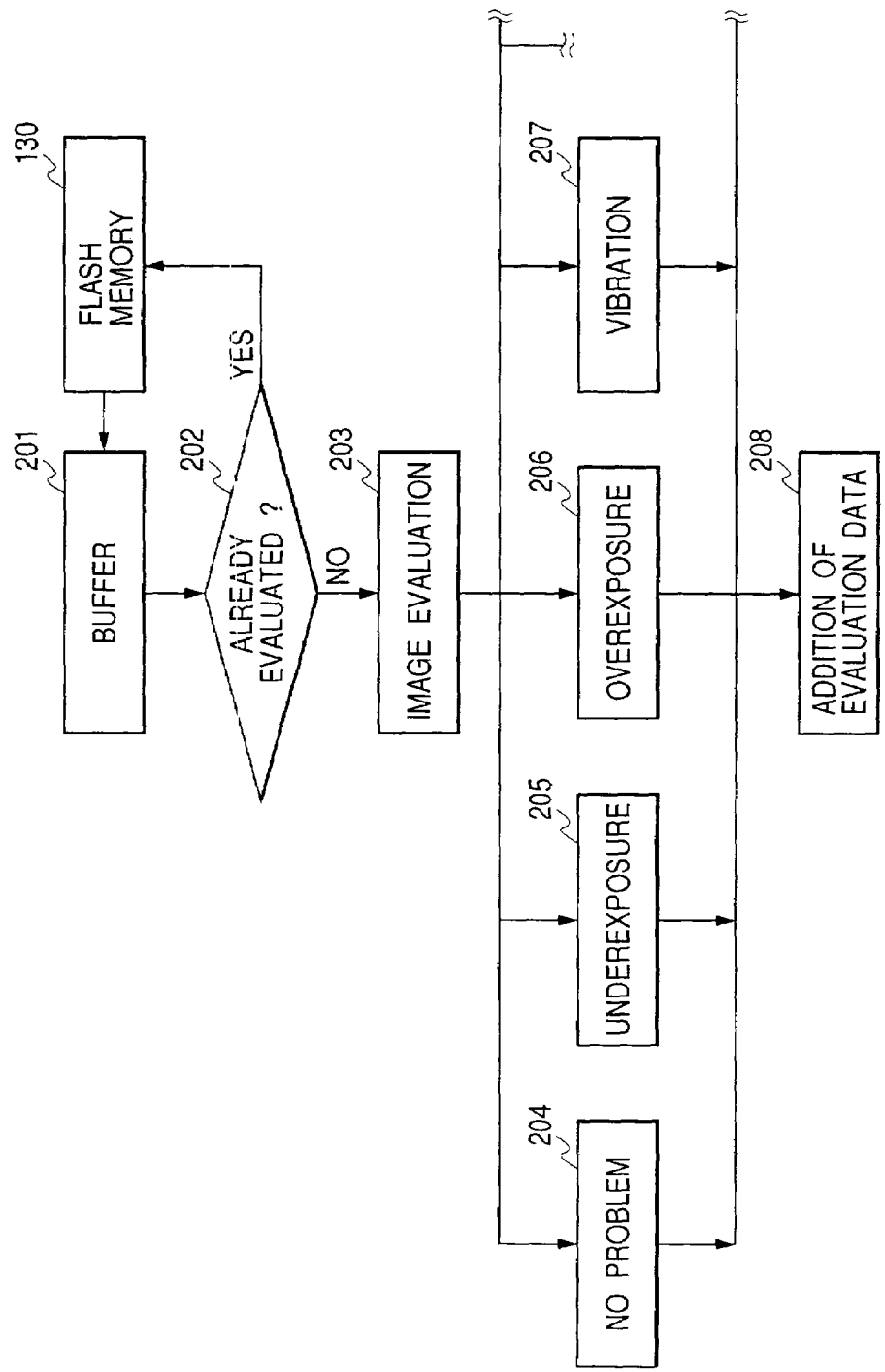
FIG. 3 is a flow chart showing an unsuccessful photography discrimination sequence of a digital still camera.

The details of the unsuccessful photography discrimination modes 1 and 2 in the process 146 will be described using FIG. 3. In these modes, image data is read out from the flash memory 130, and the unsuccessful photography discrimination unit (to be described in detail later) performs image analysis to check in the evaluation process 146 whether the images are unsuccessful photography images, together with the cause of unsuccessful photography. One image currently displayed is an image to be checked in mode 1 (process 144 in FIG. 2). All the images in the flash memory 130 are images to be checked in mode 2 (process 145). In mode 2, the images are evaluated one by one in order in the flash memory. For this reason, mode 2 is substantially equivalent in contents to mode 1.

The above evaluation is performed as follows. First of all, data is loaded from the flash memory 130 to an evaluation buffer 201 in FIG. 3. In this case, it is checked in a process 202 whether this image is already evaluated. If so, this image is skipped, and the next image is loaded.

Image analysis evaluation is performed in a process 203 to express unsuccessful photography using numerical values to evaluate the degree of unsuccessful photography.

An unsuccessful photography image discriminated in the above process is classified in accordance with its type (e.g., vibration, underexposure, or overexposure) and degree of unsuccessful photography (processes 205 to 207). The information representing the type and degree of unsuccessful photography is added to the image (process 208). Once an image is evaluated, "evaluated image" information is added to this image (process 208) even if the image is discriminated as a successful photography image (process 204). By adding this information, when the evaluated image is selected, a standby time can be shortened because this evaluated image can be automatically skipped for evaluation. The information is stored in the header area of the image file and does not influence the contents of the image.

(4) Display of Unsuccessful Photography Image

The discriminated unsuccessful photography image display in a process 147 of FIG. 2 will be described below.

As shown in FIGS. 4A to 4D, the evaluated images are displayed together with the characters or symbols representing the reasons and degrees of unsuccessful photography of the images on the color liquid crystal monitor in mode 1.

Figure 4A:
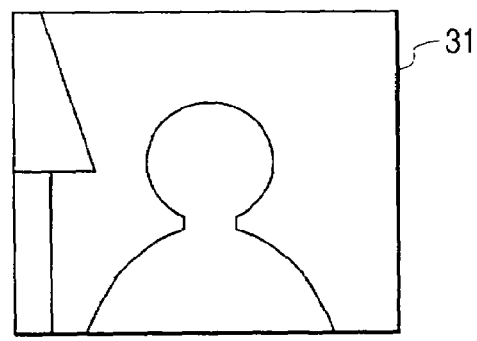
FIGS. 4A, 4B, 4C and 4D are views showing a display example (normal display) of a digital still camera.
Figure 4B:
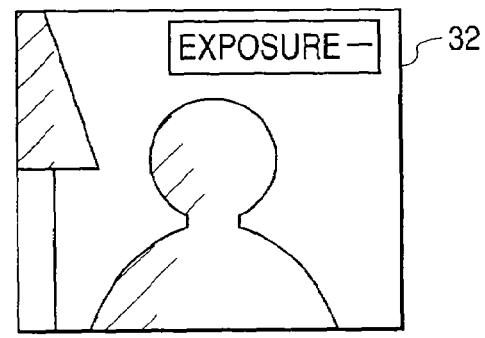
Figure 4C:
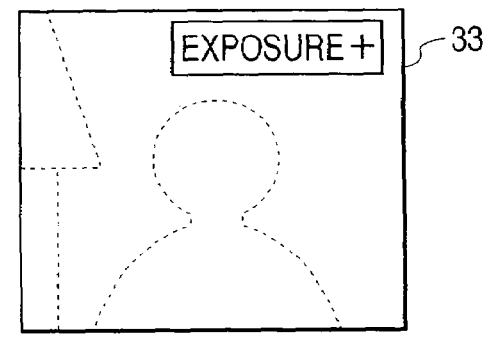
Figure 4D:
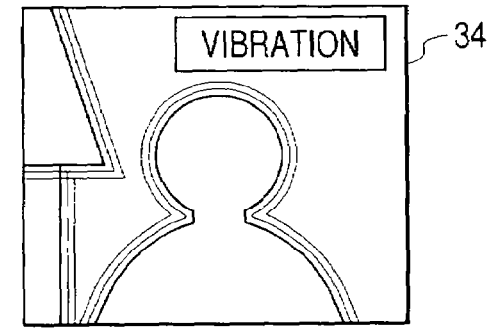

FIG. 4A shows a display 31 of the image having no problem, FIG. 4B shows the image with underexposure, FIG. 4C shows the image with overexposure, and FIG. 4D shows the image with vibration.

Figure 5:
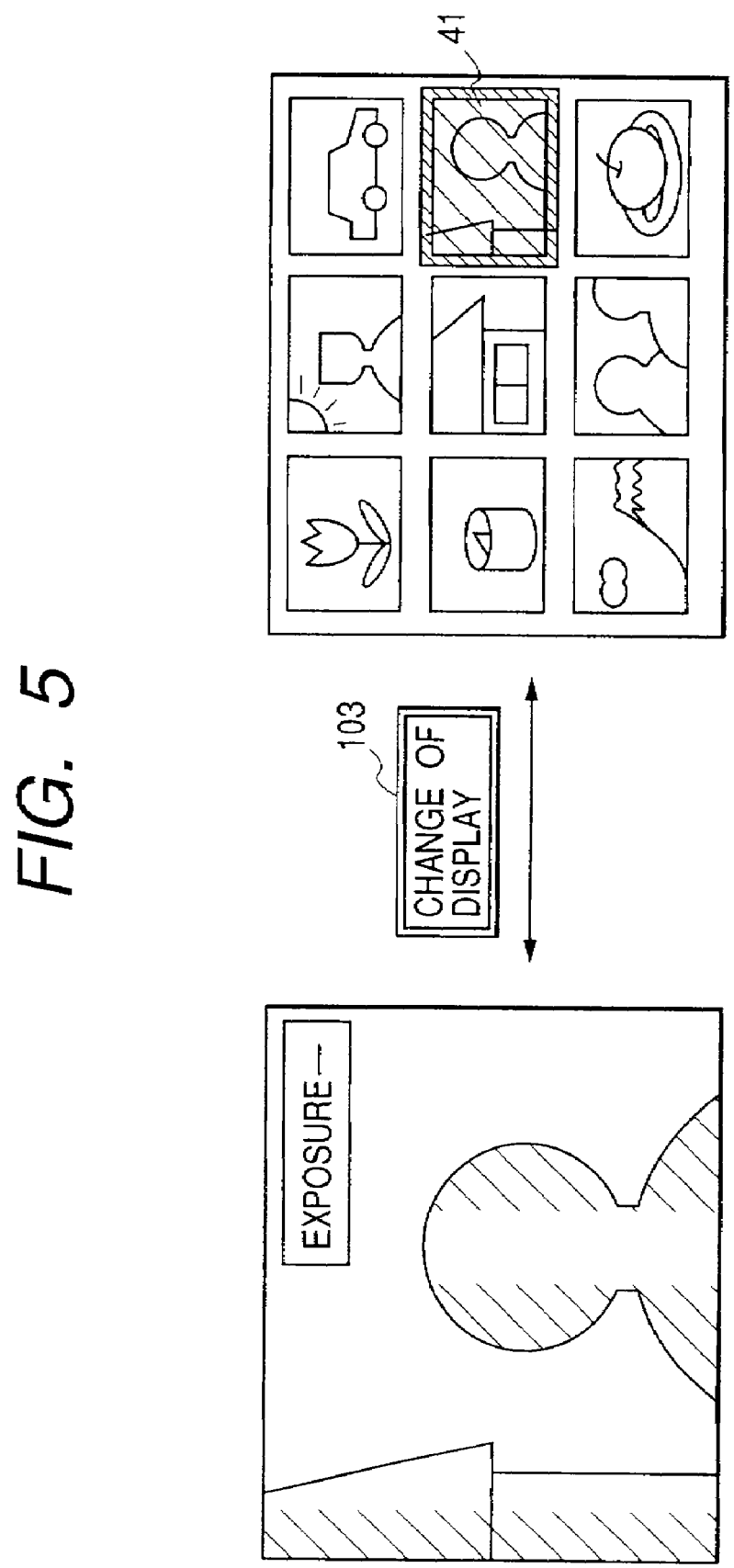
FIG. 5 is a view showing a display example (change of normal display⇌thumbnail display) of a digital still camera.
Figure 6:
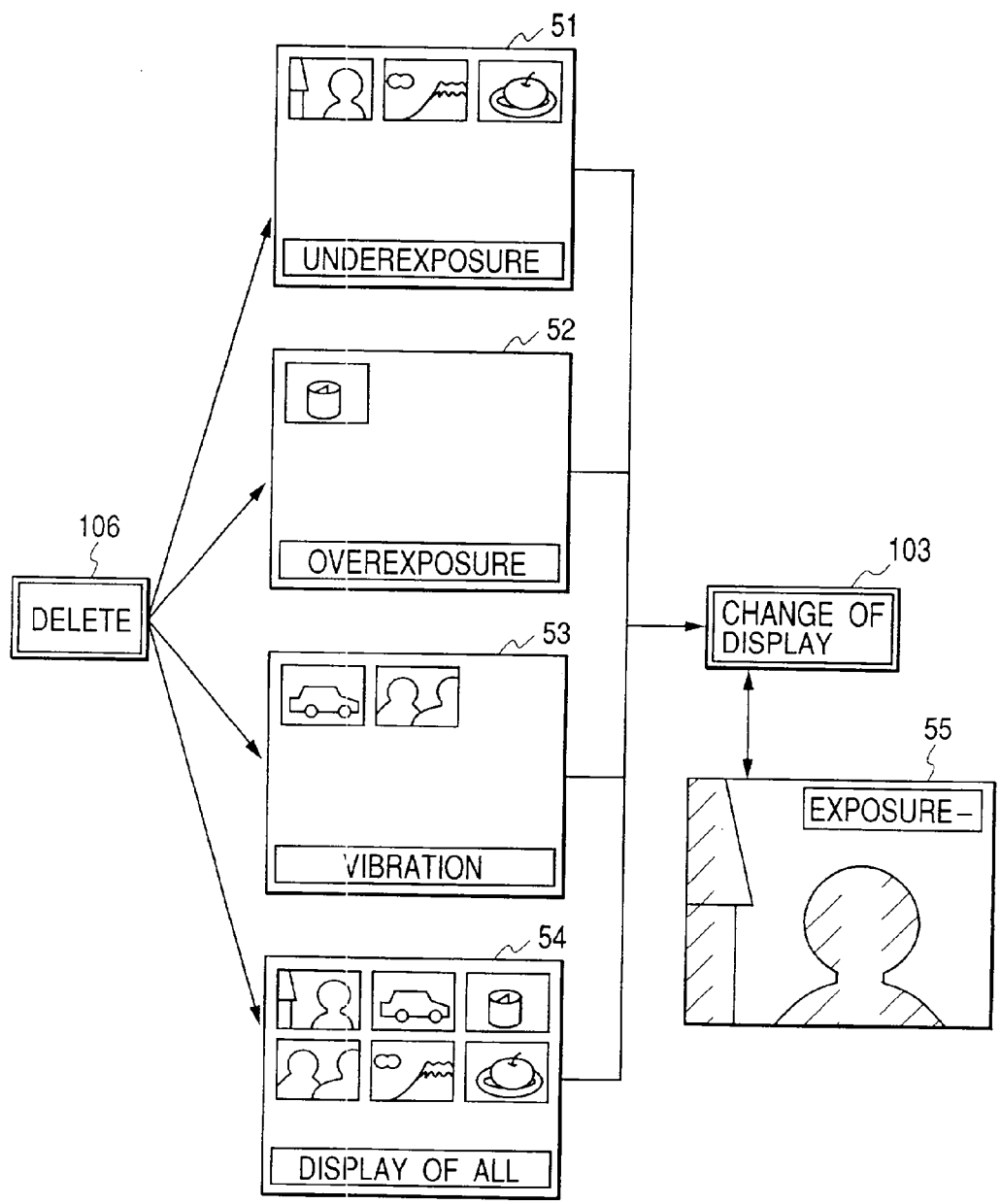
FIG. 6 is a view showing a display example (thumbnail display) of a digital still camera.

In this state, the display change switch 103 and the selection switches 107 and 108 are operated to select the thumbnail display, as shown in FIG. 5. In this case, a discriminated unsuccessful photography image is displayed in a tone color 41 different from that of the remaining images, so that the unsuccessful photography image can be discriminated even in the thumbnail mode. The same effect as described above can be obtained even when the image is flicked or the color of the image is changed in accordance with the type of unsuccessful photography.

In mode 2, only unsuccessful photography images discriminated from all the evaluated images are extracted and displayed in the thumbnail mode. The display can be switched by the deletion switch 106 in accordance with types 51 to 53 of unsuccessful photography or the degrees 54 of unsuccessful photography. Even in this state, the display change switch 103 and the selection switches 107 and 108 can be operated to change the thumbnail display to normal display 55.

(5) Delete of Unsuccessful Photography Image

A method of deleting an unsuccessful photography image extracted by the above operation will be described, as indicated in a process 134 of FIG. 2.

In mode 1, the unsuccessful photography image can be deleted by depressing the release switch 102 in a state in which unsuccessful photography is displayed.

In mode 2, all the unsuccessful photography images are collectively deleted by depressing the release switch 102 in a state in which all the unsuccessful photography images are displayed in the thumbnail mode. When the display is already switched to the normal display, only the currently displayed image is deleted.

By the above operations, the user can know not only apparent unsuccessful photography, but also the types and degree of unsuccessful photography which cannot be discriminated on a small liquid crystal display. The user will check photographic posture and correct the exposure on the basis of the above information, thereby performing appropriate photography.

The unsuccessful photography images can be deleted one by one or collectively. In this case, the types and degrees of unsuccessful photography are rearranged to delete the images in accordance with quantitative discrimination.

A method of discriminating unsuccessful photography will now be described.

Figure 8:
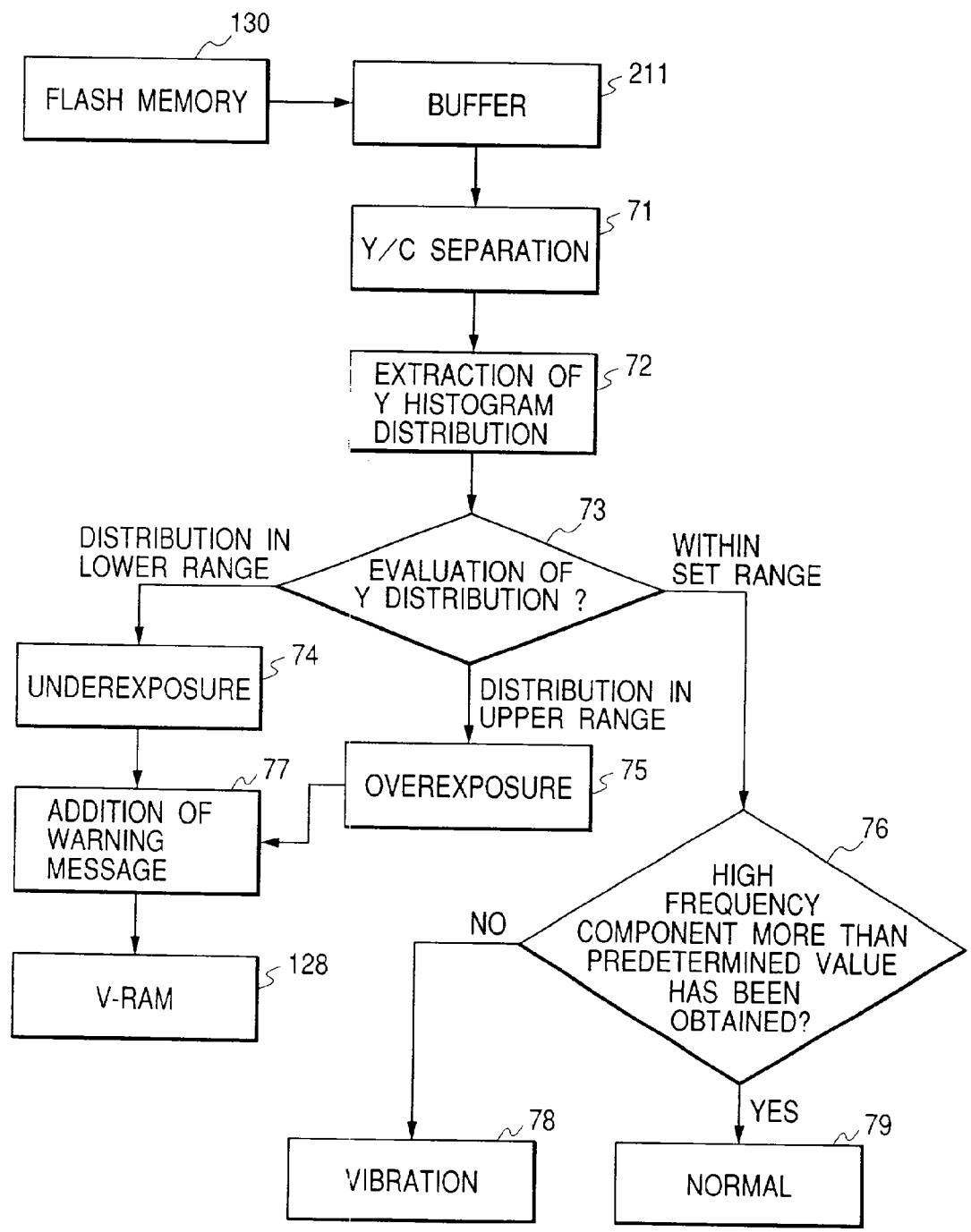
FIG. 8 is a flow chart showing an unsuccessful photography discrimination algorithm of a digital still camera.

Various methods can be proposed as a method of discriminating the types and degree of unsuccessful photography which are discriminated in the unsuccessful photography discrimination unit 120. As an example, an underexposure/overexposure discrimination algorithm shown in FIGS. 4B and 4C will be described with reference to FIG. 8.

Image data in the flash memory 130 is fetched in a buffer 211 of the unsuccessful photography discrimination unit 120, and a luminance (Y) signal is extracted from the input image data by a Y/C separation circuit 71, thereby extracting a luminance signal histogram distribution (process 72). The extracted luminance histogram distribution is evaluated (process 73) to discriminate that the distribution in the lower range is evaluated as underexposure (process 74), and the distribution in the upper range is evaluated as overexposure (process 75). If the distribution falls within the set range, it is checked whether a high frequency components more than a predetermined value has been obtained (process 76). If YES in the process 76, normal exposure is discriminated (process 79); otherwise, vibration is discriminated (process 78). When the distribution falls outside the set range, a warning message is superposed on the image (process 77), and the resultant image is output to the V-RAM 128. By the above sequence, the underexposure, overexposure, and vibration of the photographed image can be discriminated, and their warning can also be performed.

Figure 9:
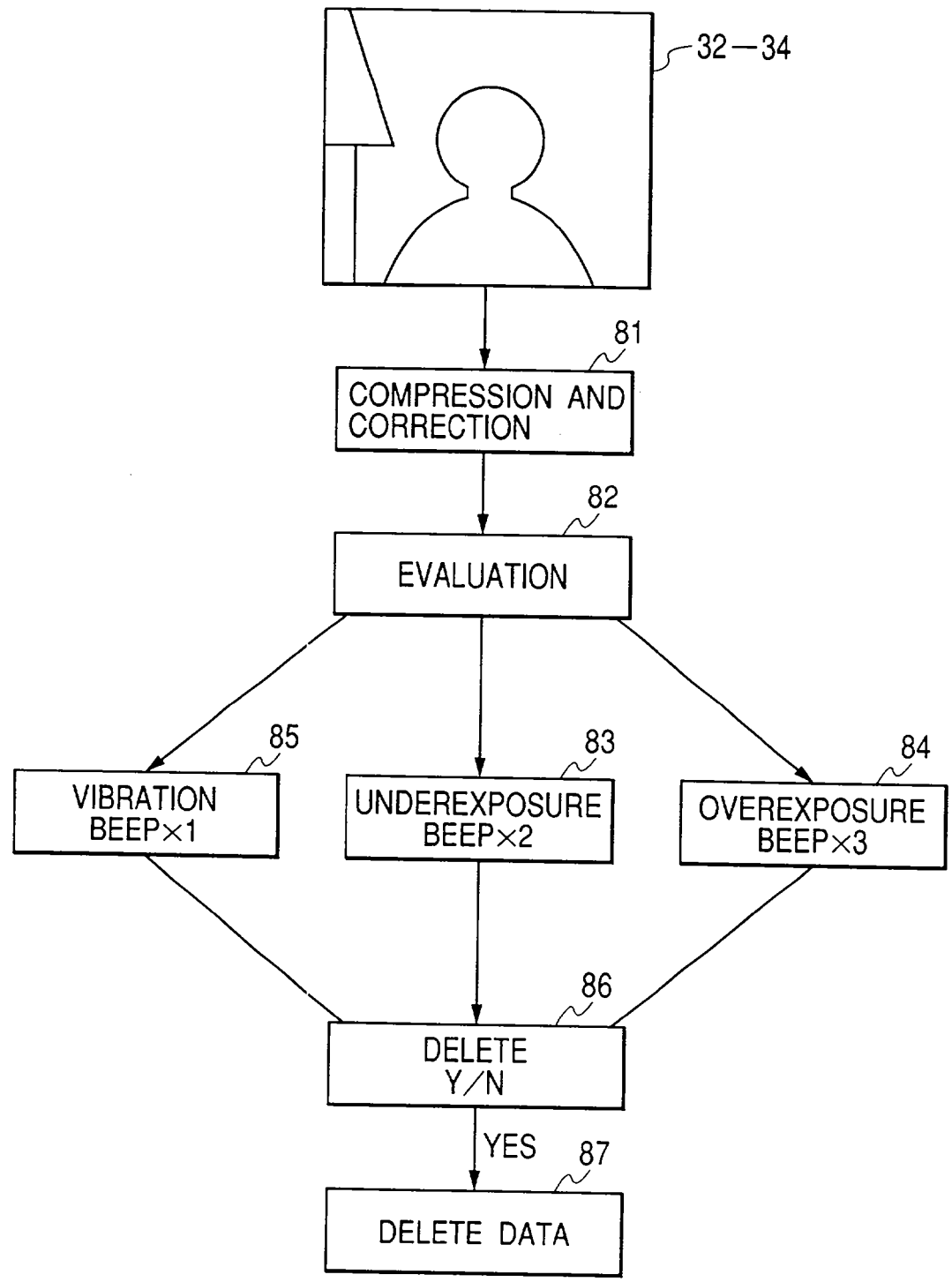
FIG. 9 is a flow chart showing an unsuccessful photography discrimination sequence of a digital still camera according to the third embodiment.

FIG. 9 shows the sequence of deleting an image in a digital still camera having an optical finder. The technique of superposing the warning symbols on the photography images 32 to 34 in FIGS. 4A to 4D and displaying them in the deletion sequence in the camera having the color liquid crystal monitor is replaced with a technique of informing the user of unsuccessful photography by the number of beep tones in place of the warning symbols. Note that the processes 83 to 85 are performed by evaluating, in a process 82, a photography image compressed and corrected in a process 81. Process 86 discriminates as to whether or not unsuccessful photography has occurred, and if so, generates a delete signal initiating process 87 to delete the data.

By executing the above processes, unsuccessful photography can be discriminated by tones in the digital still camera having no color liquid crystal monitor. Therefore, the same effect as in the second embodiment can be obtained.

Figure 10:
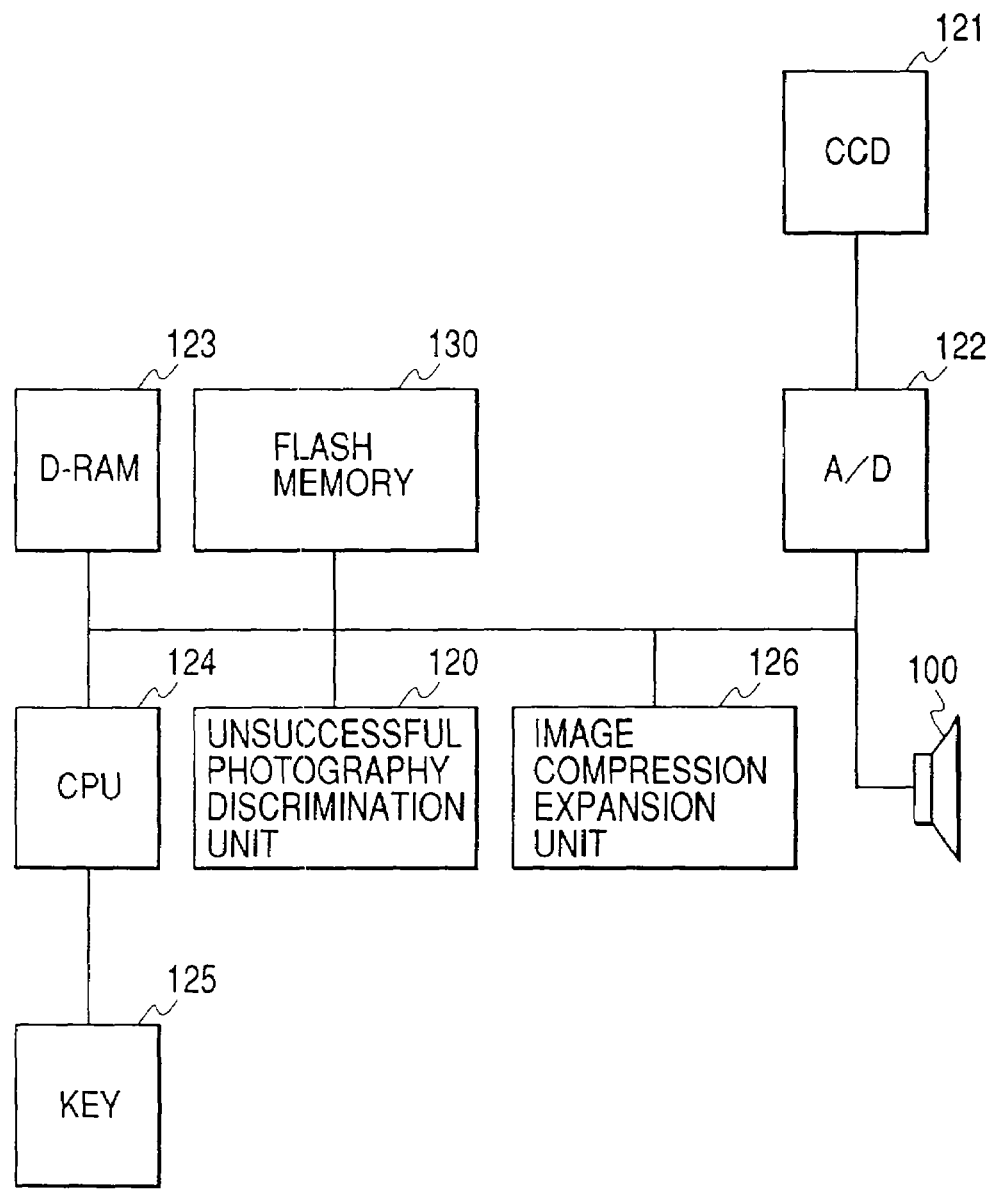
FIG. 10 is a block diagram of a digital still camera according to the third embodiment.

FIG. 10 is a block diagram of the circuit of this digital still camera. The peripheral circuits (e.g., the V-RAM 128 and the D/A converter 129) are omitted from the circuit of FIG. 7 because the color liquid crystal monitor 113 is omitted. Instead, a speaker 100 is added to output a warning tone. The circuit of FIG. 10 is substantially the same as that of FIG. 7 except for this.

As described above, according to the embodiments of the present invention, a plurality of images can be photographed and displayed by one photography designation operation. A high-resolution image compressed and encoded at a desired compression ratio can be selected.

The selected high-resolution image can be stored.

The selected high-resolution image can be transmitted to a computer or the like.

Only a desired image of the plurality of displayed images can be enlarged and displayed at a high resolution.

When the user is to select photography images serving as storage targets, an image file obtained by compressing and encoding the most favorite photography image again at a low compression ratio for small distortion can be stored. An image file obtained by compressing and encoding an unsatisfactory photography image again, which is to be stored for the time being, at a high compression ratio for a small file size can be stored.

When no photography designation is made, the currently photographed image can always be monitored as a middle-resolution image suitable for the finder.

Unsuccessful photography which cannot be conventionally known until an image is temporarily transferred to a personal computer and confirmed in it upon photography can be extracted on the spot, thereby efficiently using the memory. In addition, the cause of unsuccessful photography is displayed, which helps subsequent appropriate photography.

An unsuccessful photography image can be displayed together with its cause.

Since the contents of unsuccessful photography can be informed to the user using audio information, it is possible to evaluate a photography image in a camera having no color liquid crystal monitor. The unsuccessful photography image can be deleted on the spot.

The extracted and classified unsuccessful photography image data can be collectively deleted with a simple operation. A cumbersome operation can be greatly reduced as compared with the conventional case of deleting unsuccessful photography images one by one upon confirmation.

The causes of unsuccessful photography can be classified into underexposure, overexposure, vibration, and the like.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
    an image pickup device adapted to pick up an image of an object to output an image signal;
    an image processing device adapted to process the image signal in accordance with a photographing timing instruction signal output in response to depression of an instruction button, to generate first-resolution image data and second-resolution image data having a resolution which is not higher than that of the first-resolution image data;
    a storage control device adapted to store, in a memory, the first- and second-resolution image data of image signals of a series of frames which are obtained by consecutively picking up the image of the object;
    a display control device adapted to display, on a display screen immediately after image pickup of the series of frames, the second-resolution image data thereof stored in said memory;
    a compression encoding device adapted to compress and encode, at a predetermined compression ratio, the first-resolution image data read out from said memory; and
    an output device adapted to select compressed and encoded image data corresponding to the second-resolution image data selected by a selection operation from the first-resolution image data of the series of frames, compressed and encoded by said compression encoding device, and output the selected compressed and encoded image data to a non-volatile memory,
    wherein said compression encoding device and said output device are arranged so that said compression encoding device compresses and encodes the first resolution image data re-read out from said memory, corresponding to the selected second-resolution image data, at a compression ratio different from the predetermined compression ratio and said output device outputs the thus-compressed and encoded first-resolution image data to said non-volatile memory.

2. An apparatus according to claim 1, further comprising a transmission device adapted to transmit the selected image data.

3. An apparatus according to claim 1, wherein said display control device is arranged so as to enlarge and display on the display screen image data corresponding to the second-resolution image data selected by the image data selection operation from the second resolution image data of the series of frames, displayed on the display screen.

4. An image pickup method comprising:
    a step of processing the image signal in accordance with a photographing timing instruction signal output in response to depression of an instruction button, to generate first-resolution image data and second-resolution image data having a resolution which is not higher than that of the first-resolution image data;
    a storage step of storing, in a memory, the first-and second-resolution image data of the image signals of a series of frames which are obtained by picking up an image of the object in said picking up step;
    a step of displaying, on a display screen immediately after image pickup of the series of frames, the second-resolution image data thereof stored in said memory in said storage step;
    a step of compressing and encoding, at a predetermined compression ratio, the first-resolution image data of the series of frames read out from said memory; and
    a outputting step of selecting compressed and encoded image data corresponding to the second-resolution image data selected by a low-resolution image data selection operation from the first-resolution image data of the series of frames, compressed and encoded in said compressing and encoding step, and outputting the selected compressed and encoded image data to a non-volatile memory,
    wherein said compressing and encoding step and said outputting step are arranged so that said compressing and encoding step compresses and encodes the first-resolution image data re-read out from said memory, corresponding to the selected second-resolution image data at a compression ratio different from the predetermined compression ratio and said outputting step outputs the thus-compressed and encoded first-resolution image data to said non-volatile memory.

5. A method according to claim 4, further comprising a step of transmitting the image data selected in said outputting step.

6. A method according to claim 4, wherein said displaying step is arranged to enlarge and display on the display screen image data corresponding to the second resolution image data selected by the low-resolution image data selection operation from the second-resolution image data of the series of frames, displayed on the display screen.

7. A storage medium storing a control program for an image pickup apparatus in a state readable from a computer, the control program comprising:
    a step of picking up an image of an object to output an image signal;
    a step of processing the image signal in accordance with a photographing timing instruction signal output in response to depression of an instruction button, to generate first-resolution image data and second-resolution image data having a resolution which is not higher than that of the first-resolution image data;
    a storage step of storing, in a memory, the first-and second-resolution image data of the image signals of a series of frames which are obtained by picking up an image of the object in said picking up step;
    a step of displaying, on a display screen immediately after image pickup of the series of frames, the second-resolution image data thereof stored in said memory in said storage step;
    a step of compressing and encoding, at a predetermined compression ratio, the first-resolution image data of the series of frames read out from said memory; and
    an outputting step of selecting compressed and encoded image data corresponding to the second-resolution image data selected by a selection operation from the first-resolution image data of the series of frames, compressed and encoded in said compressing and encoding step, and outputting the selected compressed and encoded image data to a non-volatile memory, wherein said compressing and encoding step and said outputting step are arranged so that said compressing and encoding step compresses and encodes the first-resolution image data re-read out from said memory, corresponding to the selected second-resolution image data at a compression ratio different from the predetermined compression ratio and said outputting step outwits the thus-compressed and encoded first-resolution image data to said non-volatile memory.

8. A medium according to claim 7, wherein the control program further comprises a step of transmitting the image data selected in said outputting step.

9. A medium according to claim 7, wherein said displaying step is arranged so as to enlarge and display on the display screen image data corresponding to the second resolution image data selected by the image data selection operation from the second-resolution image data of the series of frames, displayed on the display screen.

* * * * *

UNITED STATES PATENT AND TRADEMARK OFFICE
CERTIFICATE OF CORRECTION

PATENT NO. : 7,038,724 B2
APPLICATION NO. : 09/110018
DATED : May 2, 2006
INVENTOR(S) : Makoto Satoh et al.

It is certified that error appears in the above-identified patent and that said Letters Patent is hereby corrected as shown below:

COLUMN 1:

Line 29, "requiring the" should read --requiring of the--.

COLUMN 2:

Line 42, "output;" should read --output--.

COLUMN 3:

Line 29, "a (CD1" should read --a CCD1--.

COLUMN 5:

Line 57, "frames." should read --frame.--.

COLUMN 6:

Line 13, "facilitate" should read --facilitates--.

COLUMN 7:

Line 9, "memory 13C" should read --memory 130--;
Line 10, "such." should read --such--;
Line 53, "106 in" should read --106 is in--; and
Line 56, "time" should read --time:--.

COLUMN 10:

Line 1, "components" should read --component--.

COLUMN 11:

Line 62, "second resolution" should read --second-resolution--.

UNITED STATES PATENT AND TRADEMARK OFFICE
CERTIFICATE OF CORRECTION

PATENT NO. : 7,038,724 B2
APPLICATION NO. : 09/110018
DATED : May 2, 2006
INVENTOR(S) : Makoto Satoh et al.

It is certified that error appears in the above-identified patent and that said Letters Patent is hereby corrected as shown below:

COLUMN 12:

Line 4, "first-and" should read --first- and--;
Line 15, "a" should read --an--;
Line 37, "second resolution" should read --second-resolution--; and
Line 52, "first-and" should read --first- and--.

COLUMN 13:

Line 10, "wits" should read --puts--.

COLUMN 14:

Line 6, "second" should read --second- --.

Signed and Sealed this

Nineteenth Day of December, 2006

JON W. DUDAS
*Director of the United States Patent and Trademark Office*